(12) United States Patent
Portoles et al.

(10) Patent No.: US 10,343,780 B2
(45) Date of Patent: Jul. 9, 2019

(54) TUBE HAVING A HYBRID-TYPE STRUCTURE, IN PARTICULAR FOR AN AIRCRAFT SEAT

(71) Applicant: Epsilon Composite, Gaillan en Medoc (FR)

(72) Inventors: Jose Portoles, Queyrac (FR); Dominique Nogues, Hourtin (FR); Matthieu Landais, Vallet (FR)

(73) Assignee: EPSILON COMPOSITE, Gaillan en Medoc (FR)

( * ) Notice: Subject to any disclaimer, the term of this patent is extended or adjusted under 35 U.S.C. 154(b) by 112 days.

(21) Appl. No.: 15/500,960

(22) PCT Filed: Jul. 16, 2015

(86) PCT No.: PCT/FR2015/051948
§ 371 (c)(1),
(2) Date: May 1, 2017

(87) PCT Pub. No.: WO2016/016538
PCT Pub. Date: Feb. 4, 2016

(65) Prior Publication Data
US 2017/0240284 A1    Aug. 24, 2017

(30) Foreign Application Priority Data

Aug. 1, 2014   (FR) ..................... 14 57475

(51) Int. Cl.
*A47C 7/02*    (2006.01)
*B64D 11/06*    (2006.01)

(52) U.S. Cl.
CPC .......... *B64D 11/0649* (2014.12); *B64D 11/06* (2013.01); *Y02T 50/46* (2013.01)

(58) Field of Classification Search
CPC .. B32B 1/08; B32B 5/12; B32B 15/00; B32B 15/04; B29C 47/0016; B29C 70/00;
(Continued)

(56) References Cited

U.S. PATENT DOCUMENTS 3,511,536 A * 5/1970 Suzuki ................ A47C 4/022
                                                        297/450.1
3,816,571 A * 6/1974 O'Driscoll ........... B29D 11/00
                                                        264/2.6
(Continued)

FOREIGN PATENT DOCUMENTS

JP    H11262545    9/1999
JP    2004330559   11/2004
(Continued)

OTHER PUBLICATIONS

Notification of Reasons for Refusal dated Dec. 20, 2017 (6 pages including English translation) from corresponding Japanese Application No. 2017505502.
(Continued)

*Primary Examiner* — Shin H Kim
(74) *Attorney, Agent, or Firm* — Brinks Gilson & Lione; John C. Freeman

(57) ABSTRACT

A hybrid tube, in particular for an aircraft seat structure includes ribs intended to receive the hybrid tube. The hybrid tube includes a monolithic carbon tube and at least one sleeve made from a ductile material and connected to the carbon tube by means of gluing, shrink-fitting or over-molding.

14 Claims, 3 Drawing Sheets

(58) Field of Classification Search
CPC ..... B29C 2031/771; Y10T 428/249945; Y10T 428/2933; Y10T 428/2951
USPC .............................. 428/299.1, 367, 375–385
See application file for complete search history.

(56) References Cited

U.S. PATENT DOCUMENTS

| | | | | |
|---|---|---|---|---|
| 4,769,892 | A * | 9/1988 | Kneller | B21D 39/04 29/407.08 |
| 5,653,507 | A * | 8/1997 | Moore | A47C 1/124 297/188.08 |
| 5,765,285 | A * | 6/1998 | Buy | B29C 53/083 138/140 |
| 5,946,845 | A * | 9/1999 | Yasui | A01K 87/005 43/18.1 HR |
| 6,059,369 | A * | 5/2000 | Bateson | B29C 70/222 297/452.18 |
| 6,299,251 | B1 * | 10/2001 | Harper | A47C 4/04 297/331 |
| 6,423,388 | B1 * | 7/2002 | Bateson | B29C 70/222 297/452.2 |
| 7,066,551 | B2 * | 6/2006 | Johnson | A47C 5/043 244/118.6 |
| 7,300,112 | B2 * | 11/2007 | Johnson | A47C 5/043 244/118.6 |
| 7,716,797 | B2 * | 5/2010 | Kismarton | B64D 11/06 244/122 R |
| 7,767,134 | B2 * | 8/2010 | Xue | A24D 3/02 131/211 |
| 8,336,965 | B2 * | 12/2012 | Kismarton | B64D 11/06 297/232 |
| 8,376,456 | B2 * | 2/2013 | Fujita | B32B 7/12 297/216.1 |
| 8,840,740 | B2 * | 9/2014 | Rorabaugh | B64D 37/32 156/160 |
| 9,090,352 | B2 * | 7/2015 | Saada | B60N 2/686 |
| 9,587,772 | B2 * | 3/2017 | Jaspaert | F16L 53/30 |
| 9,630,717 | B2 * | 4/2017 | Wilkens | B64D 11/0644 |
| 9,809,018 | B2 * | 11/2017 | Pozzi | B64D 11/06 |
| 2004/0050443 | A1 * | 3/2004 | Trivelli | B29C 63/34 138/143 |
| 2004/0212243 | A1 * | 10/2004 | Johnson | A47C 5/043 297/452.18 |
| 2004/0258863 | A1 * | 12/2004 | Kobayashi | H02G 15/103 428/34.9 |
| 2007/0000508 | A1 * | 1/2007 | Xue | A24D 3/02 131/361 |
| 2008/0150342 | A1 * | 6/2008 | Kismarton | B64D 11/06 297/452.18 |
| 2008/0282523 | A1 * | 11/2008 | Kismarton | B64D 11/06 29/91.1 |
| 2008/0290242 | A1 * | 11/2008 | Kismarton | A47C 5/00 248/503.1 |
| 2009/0084925 | A1 * | 4/2009 | Kismarton | A47C 5/00 248/503.1 |
| 2009/0165662 | A1 * | 7/2009 | Ritchie | B41F 13/10 101/376 |
| 2010/0163064 | A1 * | 7/2010 | Xue | A24D 3/02 131/200 |
| 2010/0196637 | A1 * | 8/2010 | Lippert | B29C 70/345 428/36.1 |
| 2011/0136602 | A1 * | 6/2011 | Hsu | A63B 49/11 473/535 |
| 2011/0226375 | A1 * | 9/2011 | Harris | B32B 1/08 138/137 |
| 2012/0196062 | A1 * | 8/2012 | Sato | F03G 7/005 428/35.2 |
| 2012/0326433 | A1 * | 12/2012 | Rorabaugh | B64D 37/32 285/47 |
| 2013/0273286 | A1 * | 10/2013 | Luo | C08L 81/04 428/36.91 |
| 2013/0273287 | A1 * | 10/2013 | Luo | B32B 1/08 428/36.91 |
| 2013/0307310 | A1 * | 11/2013 | Saada | B60N 2/686 297/452.2 |
| 2015/0091293 | A1 * | 4/2015 | Rorabaugh | B64D 37/32 285/47 |
| 2015/0247025 | A1 * | 9/2015 | Ichikawa | C09C 3/08 428/220 |
| 2015/0252929 | A1 * | 9/2015 | Jaspaert | F16L 53/30 285/41 |
| 2015/0314501 | A1 * | 11/2015 | Maslakow | B64D 11/0649 297/452.18 |
| 2015/0321441 | A1 * | 11/2015 | Marcoe | B32B 1/08 87/9 |
| 2015/0330536 | A1 * | 11/2015 | Jaspaert | F16L 53/30 138/137 |
| 2017/0175940 | A1 * | 6/2017 | Jaspaert | F16L 53/30 |
| 2017/0240284 | A1 * | 8/2017 | Portoles | B64D 11/06 |
| 2018/0162070 | A1 * | 6/2018 | Iwata | B29C 70/12 |

FOREIGN PATENT DOCUMENTS

| | | |
|---|---|---|
| JP | 2006297926 | 11/2006 |
| JP | 2008307842 | 12/2008 |
| JP | 2009232803 | 10/2009 |
| WO | WO 82/03366 | 10/1982 |

OTHER PUBLICATIONS

Preliminary Search Report dated Mar. 4, 2015 out of French priority Application No. 1457475 (6 pages).
International Search Report dated Oct. 22, 2015 out of PCT priority Application No. PCT/FR2015/051948 (4 pages including English translation).
Written Opinion dated Oct. 22, 2015 out of PCT priority Application No. PCT/FR2015/051948 (5 pages).

* cited by examiner

TUBE HAVING A HYBRID-TYPE STRUCTURE, IN PARTICULAR FOR AN AIRCRAFT SEAT

This application claims priority to International Application No. PCT/FR2015/051948 filed Jul. 16, 2015 and to French Application No. 1457475 filed Aug. 1, 2014; the entire contents of each are incorporated herein by reference.

BACKGROUND

The present invention relates to a tube having a hybrid-type structure, in particular usable for the realization of an aircraft seat structure.

SUMMARY

In aeronautics, both the manufacturers and the operators are constantly looking to reduce the empty load of an airplane in order to reduce the fuel consumption in moving this empty load.

Fuel is an extremely important item in the profitability of an airplane and any reduction in fuel consumption translates into a savings.

On the other hand, one item which should not suffer from savings on weight is passenger safety, especially in event of an accident.

It is also necessary to preserve or even improve the comfort of said passengers.

Given that those who use this mode of transportation spend the most part of the flying time and the waiting on the ground in a seated posture, the seats represent an important element in the design of an airplane.

A seat is composed of a sitting surface and a back surface for the portion directly accommodating the user, and this seat/back assembly is received in a support structure S which is itself connected to the floor of the airplane.

While the seat/back assembly can be made from a comfort material, such as foam, with a shell of composite material, for example, such is not the case with the support structure S of said shell. In fact, the structure S provides the interface between the floor and the seat or seats.

Since the floor is resistant, it is necessary to adjust the resistance of the support in order to meet the needs defined by the current aeronautical standards.

Moreover, to avoid any accident, the integrity of the structure S must be preserved in event of an impact within these specified standards.

The seats currently used to meet these different requirements and conditions are made of specific grades of aluminum alloy.

The structure S, as represented in the prior art FIG. 7, comprises reinforcement structures 10, connection spars 12 and feet 14 for fixation to the floor of said airplane.

These reinforcement structures 10 have an L shape generally to receive the sitting surface 16 of the seat on the horizontal branch of the L and the back 18 of the seat on the vertical part of said L, the seat and the back being represented by dashed lines.

These reinforcement structures 10 likewise receive the arm rests associated with the seats, not being shown.

The connection spars 12 are arranged to mechanically connect these reinforcement structures 10, parallel to each other, and to support them, since not all of the reinforcement structures necessarily contain a foot.

The spars are generally tubes of circular section, monolithic, mounted by means of open sockets 20 produced in said reinforcement structures.

These tubes are currently made of a specific monolithic aluminum alloy.

This alloy affords a major advantage, namely, its plasticity. Under an impact, the tubes become deformed, without breaking. The tubes do not generate free pieces, broken off at one end and likely to cause an additional risk of injury to the passengers in event of an accident.

One solution consists in replacing the aluminum tubes by carbon tubes in order to reduce the final weight of the structure S.

One finds that all-carbon monolithic tubes have a very high strength, but, under stress, the rupture is total and is likely to produce free pieces.

The present invention proposes a structure tube S, especially for an aeronautical seat, which comprises an arrangement able to overcome the problems just mentioned and to reduce the weight of said structure S.

The hybrid tube according to the invention is designed in particular for an airplane seat structure S, said structure comprising reinforcement structures adapted to receiving said hybrid tube, this hybrid tube comprising a monolithic carbon tube and at least one sleeve of ductile material, added on to and fixed to said carbon tube by gluing or shrink fitting. The integration of the carbon tube with the sleeve of ductile material by gluing or shrink fitting enables a plastic deformation of the sleeve during a breaking of the carbon tube at right angles to the reinforcement structures during an accident and thus guarantees a continuity of the seat structure S.

Advantageously, the carbon tube is a tube produced by pultrusion. This makes it possible to have a tube with great dimensional precision.

Advantageously, the sleeve comprises two peripheral end chamfers. This makes it possible to lessen the stresses at the junction between the sleeve and the carbon tube.

According to a first variant, the sleeve is of metallic material, since metal has a better capacity for transverse deformation under stress than the carbon tube.

According to a particular disposition, the metallic material of the sleeve is an aluminum alloy. This makes it possible to limit the weight of the seat.

According to a second variant, the sleeve is made of thermoplastic material, added on to and fixed to said carbon tube by gluing, shrink fitting, or over-molding. The thermoplastic material has a more substantial capacity for transverse deformation under stress than the carbon tube.

According to a particular disposition, the sleeve is disposed on the outside of the carbon tube. It thus surrounds the carbon tube.

According to another disposition, the sleeve is disposed on the inside of the carbon tube. The disposition on the inside of the tube enables a supporting of the tube. The combination of an inner and outer sleeve further improves the strength of the unit.

The invention concerns also an airplane seat structure S comprising at least two reinforcement structures each comprising at least two sockets and at least two hybrid tubes with at least one of the preceding characteristics, said hybrid tubes passing through said sockets, the tube being monolithic, and the sleeves being disposed at right angles to the sockets.

BRIEF DESCRIPTION OF THE DRAWINGS

The tube according to the present invention shall now be described in detail according to a particular, non-limiting embodiment, with respect to the enclosed drawings which represent in the various figures.

DETAILED DESCRIPTION

Figure 7:
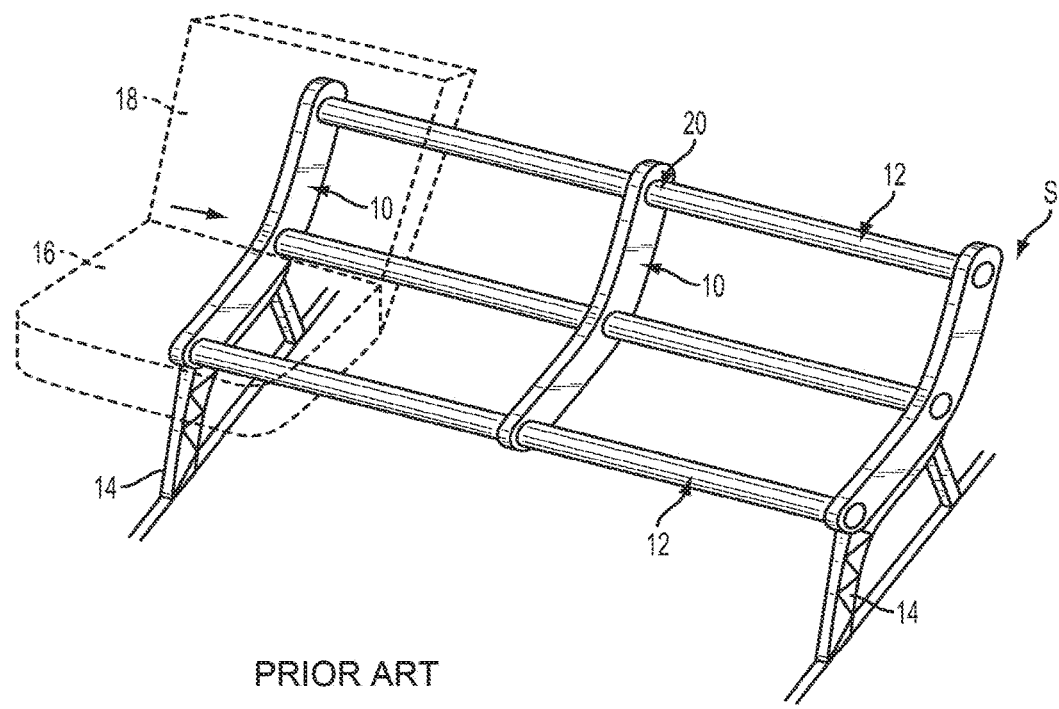
FIG. 7: a view of a structure S of the prior art.
Figure 1:
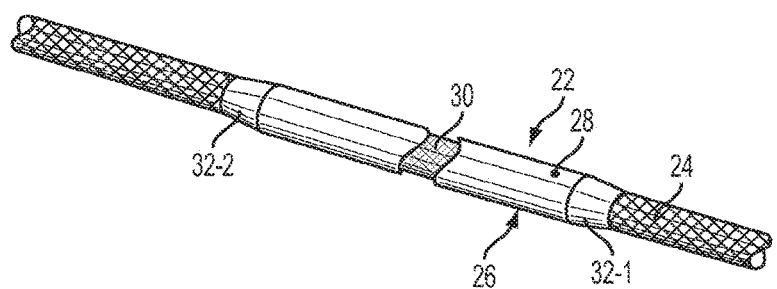
FIG. 1: a view of a hybrid tube according to the present invention, with a partial cutaway in the middle portion of the sleeve.

In FIG. 1, the hybrid tube 22 according to the present invention comprises a carbon tube 24 and at least one sleeve 26; in FIGS. 1 to 4, the sleeve is an outer sleeve.

The carbon tube 24 is obtained preferably and as the best embodiment by pultrusion so as to take advantage of the benefits of this manufacturing process.

In fact, the pultruded tube has great dimensional precision and perfect straightness.

Moreover, the fibers can be disposed with an angle in relation to the adapted pull direction, unidirectional, 45°, 60°, of desired number, with desired diameters and types of fibers.

These fibers can be chosen among high-strength carbon in order to achieve high performance up to 6000 MPa in tensile strength with a Young's modulus of 250 to 300 GPa.

Pultrusion also makes possible a continuous production and a cutting to length of the tubes with great precision.

Each tube 24 used is of carbon and monolithic.

Each sleeve 26 is made of ductile material such as a thermoplastic or metallic material, in the present case the material is an aluminum alloy of current use and per the aeronautical standards.

The sleeves 26 are provided at right angles to the socket 20 of each reinforcement structure 10.

The sleeve 26 is added on by fitting and mounted coaxially on the carbon tube 24.

The sleeve 26 has the diameter of the socket 20 of the reinforcement structure 10, except for the fitting clearance.

The carbon tube 24 has an outer diameter equal to the inner diameter of the sleeve 26, except for the mounting clearance.

Each sleeve 26 is advantageously provided with an opening 28 adapted to the injection of glue 30, as will be explained later on, or to exert a pressure in order to promote the flow between the carbon tube and said sleeve.

Each sleeve is added on to and fixed to the carbon tube by gluing. Another means of integration could also be shrink fitting, for example.

The glue is introduced at the sleeve/carbon tube interface by any means, whether injection and/or vacuum drawing. One should ensure a perfect distribution of the glue in a layer of homogeneous thickness. One glue suitable for this type of assembly is an epoxy type glue.

This hybrid tube 22 so formed and subjected to stress tests shows an excellent mechanical strength with a work of plastic mechanical deformation of the sleeve and a rupture of the carbon tube 24, this being at right angles to each end of the sleeve, while the stresses are cumulative at right angles to the periphery of said sleeve.

In order to remedy this drawback, the present invention proposes to thin the ends of each sleeve 26 by forming a peripheral chamfer 32-1, 32-2 at the end. This chamfer is made at the distal ends.

Preferably, the slope is gentle, the angle being of the order of 3°.

Figure 2:
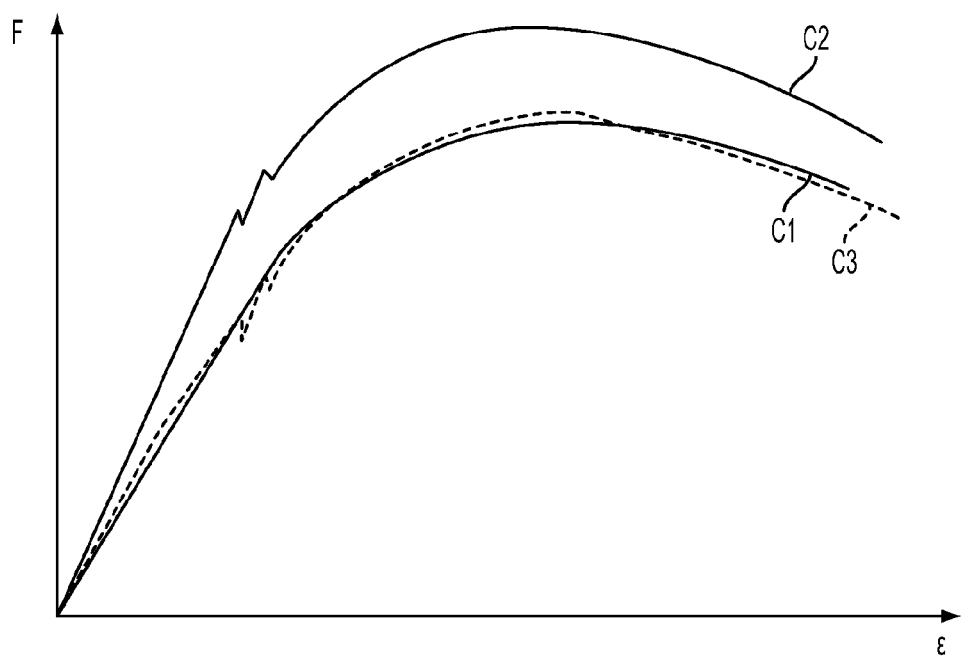
FIG. 2: a view of comparison test curves with a tube according to the present invention as compared to a curve obtained with a tube of the prior art and a curve obtained with the hybrid tube.

In the curves of FIG. 2, there is represented the deformation ε of a connection tube of aluminum alloy in curve C1, subjected to a load F, namely, a force exerted in the median plane of said sleeve and perpendicular to it.

One notices a satisfactory plastic deformation, without total rupture.

In curve C2, there is represented the deformation of a hybrid connection tube according to the present invention. One notices that the maximum strength is greatly improved with a sleeve realized in the same tube as previously, thus with the same aluminum alloy, but combined with a monolithic pultruded carbon tube.

It is noticed that the deformation is likewise plastic, thanks to the presence of the sleeve.

On the other hand, examination shows a rupture of the carbon tube in the middle portion of the sleeve, that is, the pieces of the pultruded carbon tube so generated are not dissociated from the sleeve, which prevents any injury to the passenger by the pieces of tube on account of this rupture.

Hence, this makes it possible to benefit from a strong absorption of impact energy experienced by the passenger on the seat, due to the rupture of this connection tube, but with a plastic deformation thanks to the deformation of the sleeve.

Once the rupturing of the composite tube has occurred, the pieces of the composite tube on either side of the rupture remain perfectly joined to the sleeves by the glue, and since the metallic sleeve remains in one piece, the ends are not dissociated.

The tube according to the present invention makes it possible to exploit the weight difference achieved by replacing a portion of the tube of aluminum alloy with a carbon tube, or a 15 to 20% gain in the order of magnitude.

What is more, one finds that the strength of the hybrid tube according to the present invention is greatly increased beyond what is needed. It is thus possible to preserve the entire safety required by the current standards while further reducing the thickness of the sleeves and carbon tubes so as to respect that standard.

This represents a second source of weight savings.

This weight savings is in no way a loss of safety, but instead for the same safety it allows a major weight gain to allow fuel consumption savings which are favorable to the passengers and favorable to the environment.

Thus, the goal is to achieve a hybrid tube according to the invention whose profile is that of the curve C3.

Figure 3:
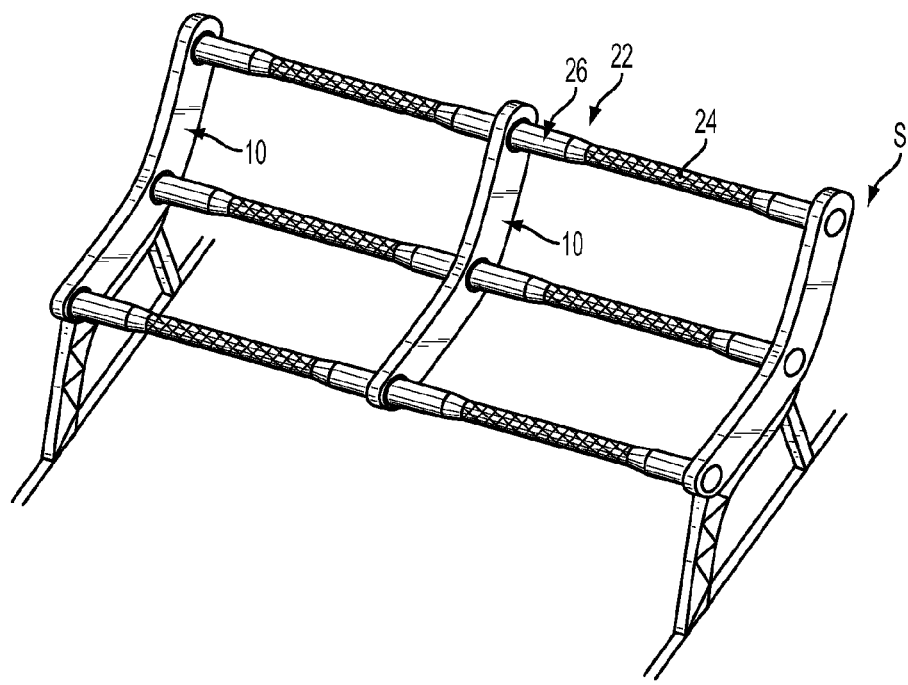
FIG. 3: a view of a structure S outfitted with the hybrid tube according to the present invention.
Figure 4:
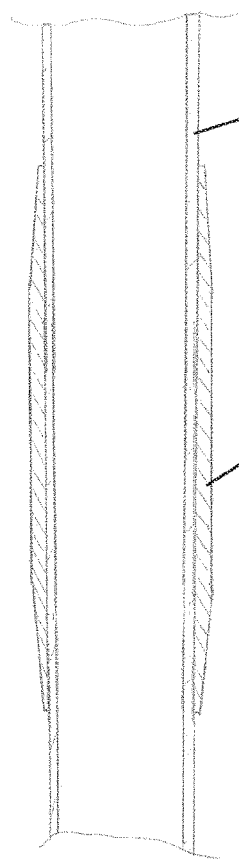
FIG. 4: a cross section of the tube through the sleeve according to a first embodiment.

In FIG. 3, the structure S outfitted with the hybrid tubes 22 according to the present invention comprises reinforcement structures and hybrid tubes, the sleeves being disposed at right angles to the reinforcement structures, which constitute the points of application of forces involved in a possible accident.

The outer diameter remains identical to the diameter of the prior art, so long as this is useful, and only the thickness of the metallic sleeve is decreased and the carbon tube is adapted.

If the outer diameter of the sleeves is preserved, the existing reinforcement structures can then also be preserved with their sockets and their possible homologation, if that should prove necessary.

Moreover, the aluminum alloy grade can also be modified.

Another advantage due to the slight length represented by the metallic material in the hybrid tube according to the invention is that it is possible to replace the aluminum alloy based material with another metallic material such as titanium whose properties may even be superior.

Figure 5:
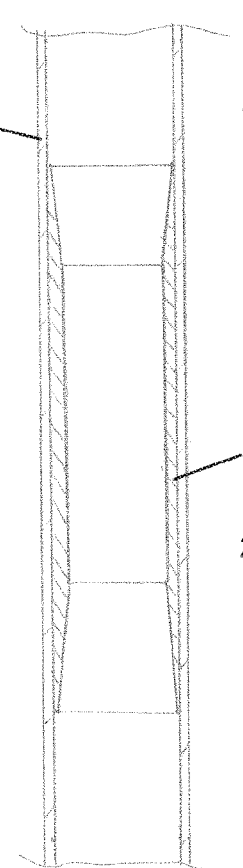
FIG. 5: a cross section of the tube through the sleeve according to a second embodiment.
Figure 6:
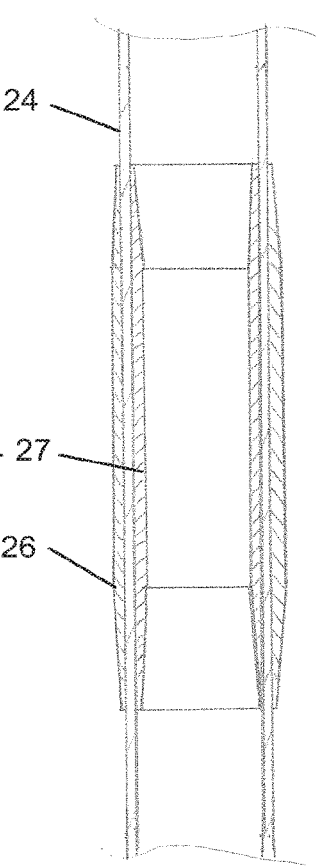
FIG. 6: a cross section of the tube through the sleeve according to a third embodiment.

The outer sleeve 26 can be replaced (FIG. 5) or supplemented (FIG. 6) with an inner sleeve 27. In the case of FIG. 6, the tube 24 combines an outer sleeve 24 and an inner sleeve 27, which strengthens the resistance of the tube 24.

The invention claimed is:

1. A seat structure comprising:
   a first reinforcement structure having an L-shape;
   a second reinforcement structure having an L-shape, wherein the second reinforcement structure is separated by the first reinforcement structure by a gap;
   a hybrid tube that spans the gap and is attached to both the first reinforcement structure and the second reinforcement structure, wherein the hybrid tube comprises:
     a monolithic carbon tube comprising carbon fibers; and
     a cylindrical sleeve piece of ductile material comprising a peripheral end chamfer, wherein the cylindrical sleeve piece has a length smaller than a length of the monolithic carbon tube, and the cylindrical sleeve piece is added on to and fixed to the monolithic carbon tube by gluing or shrink fitting.

2. The seat structure according to claim 1, wherein the monolithic carbon tube is a tube made by pultrusion.

3. The seat structure according to claim 1, wherein the cylindrical sleeve piece comprises a second peripheral end chamfer.

4. The seat structure according to claim 1, wherein the cylindrical sleeve piece is made of a metallic material.

5. The seat structure according to claim 4, wherein the metallic material is an aluminum alloy.

6. The seat structure according to claim 4, wherein the cylindrical sleeve piece is made of a thermoplastic material, added on to and fixed to the monolithic carbon tube by gluing, shrink fitting, or over-molding.

7. The seat structure according to claim 4, wherein the cylindrical sleeve piece is disposed on an outside portion of the monolithic carbon tube.

8. The seat structure according to claim 4, wherein the cylindrical sleeve piece is disposed on an inside portion of the monolithic carbon tube.

9. A seat structure comprising:
   a first reinforcement structure having a first hole and a second hole;
   a second reinforcement structure having a third hole and a fourth hole, wherein the second reinforcement structure is separated by the first reinforcement structure by a gap; and
   a first hybrid tube passing through the first hole and the third hole, wherein the first hybrid tube comprises:
     a first monolithic carbon tube; and
     a first sleeve of ductile material disposed at a right angle to the first hole and the third hole, wherein the first hybrid tube is added on to and fixed to the first monolithic carbon tube by gluing or shrink fitting; and
   a second hybrid tube passing through the second hole and the fourth hole, wherein the second hybrid tube comprises:
     a second monolithic carbon tube; and
     a second sleeve of ductile material disposed at a right angle to the second hole and the fourth hole, wherein the second hybrid tube is added on to and fixed to the second monolithic carbon tube by gluing or shrink fitting.

10. The seat structure according to claim 1, wherein the hybrid tube is straight from a first end of the hybrid tube to a second end of the hybrid tube.

11. The seat structure according to claim 1, wherein the peripheral end chamfer is positioned closer to the first reinforcement structure than the second reinforcement structure and faces away from the first reinforcement structure.

12. The seat structure according to claim 1, wherein the peripheral end chamfer comprises an annular surface that extends from a first end of the peripheral end chamfer to a second end of the peripheral end chamfer, and wherein the annular surface faces an annular surface of the monolithic carbon tube.

13. The seat structure according to claim 9, wherein the first hybrid tube is straight from a first end of the hybrid tube to a second end of the hybrid tube.

14. The seat structure according to claim 9, wherein a portion of the first sleeve is inserted into the first hole.

* * * * *